(12) United States Patent
Whittaker et al.

(10) Patent No.: US 6,358,041 B1
(45) Date of Patent: Mar. 19, 2002

(54) THREADED HEAT SHIELD FOR BURNER NOZZLE FACE

(75) Inventors: Gary Scott Whittaker; Steven James Hrivnak; Woodward Clinton Helton; Daniel Isaiah Saxon, all of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/553,823

(22) Filed: Apr. 21, 2000

(51) Int. Cl.[7] ................................................ F23D 11/36
(52) U.S. Cl. ..................... 431/160; 431/187; 239/132.3; 239/397.5
(58) Field of Search ................. 431/160, 159, 431/187, 181, 154; 239/132, 132.3, 288, 288.3, 288.5, 600, 397.5, 103; 137/377, 379

(56) References Cited

U.S. PATENT DOCUMENTS

| 4,887,962 A | | 12/1989 | Hasenack et al. | |
|---|---|---|---|---|
| 4,952,218 A | * | 8/1990 | Lipp et al. | 239/132.2 |
| 5,275,336 A | * | 1/1994 | Stasi et al. | 239/84 |
| 5,511,725 A | | 4/1996 | Barker et al. | |
| 5,553,784 A | * | 9/1996 | Theurer | 239/403 |
| 5,630,319 A | * | 5/1997 | Schilling et al. | 60/747 |
| 5,791,563 A | * | 8/1998 | Marchionda et al. | 239/424.5 |

FOREIGN PATENT DOCUMENTS

| EP | 0 362 997 | | 4/1990 |
| EP | 0 742 412 A1 | * | 11/1996 |
| WO | 00 07713 | | 2/2000 |

* cited by examiner

Primary Examiner—Ira S. Lazarus
Assistant Examiner—Josiah C. Cocks
(74) Attorney, Agent, or Firm—Matthew Smith; Bernard Graves

(57) ABSTRACT

A burner nozzle assembly for the production of synthesis gas in a synthesis gas generation chamber has a cooling water jacket face that is protected from hot gas corrosion by an annular shield fabricated from a high melting point material. The heat shield is affixed to the cooling water jacket face by means of a threaded retaining member that engages in one of the surfaces an aligned channel having correspondingly mating threads.

16 Claims, 5 Drawing Sheets

THREADED HEAT SHIELD FOR BURNER NOZZLE FACE

BACKGROUND OF THE INVENTION

1. Field of the Invention

The present invention relates to an apparatus for a partial oxidation synthesis gas generation of carbon monoxide, carbon dioxide and hydrogen from the combustion of a fossil fuel source in the presence of water and oxygen. Specifically, the present invention relates to a shielding means for protecting the combustion facing surface of a fuel-injection burner assembly utilized in a synthesis gas combustion chamber. More particularly, the present invention relates to a means for affixing a heat shield to the surface of the cooling water jacket.

2. Background of the Invention

Synthesis gas mixtures comprising carbon monoxide and hydrogen are important commercially as a source of gaseous feed stocks, such as hydrogen, for hydrogenation reactions and as a source of feed gas for the synthesis of hydrocarbons, oxygen-containing organic compounds or ammonia.

Generally, in a synthesis gas operation a fuel stream composed primarily of a pumpable slurry of finely particulated coal and water are sprayed along with an oxidizer into the refractory-lined combustion chamber of the synthesis gas generator. The oxidizer gas contains substantial quantities of free oxygen to support the combustion reaction of the coal. The combustion reaction components of fuel and oxidizer are sprayed under significant pressure, typically about 80 bar, into the synthesis gas combustion chamber. A hot gas stream is produced in the combustion chamber at a temperature in the range of about 700° C. to about 2500° C. and at a pressure in the range of about 1 to about 300 atmospheres and more particularly, about 10 to about 100 atmospheres. The effluent raw gas stream from the gas generator includes such gasses as hydrogen, carbon monoxide, carbon dioxide and can include other gases such as methane, hydrogen sulfide and nitrogen depending on the fuel source and reaction conditions.

The partial combustion of a sulfur bearing hydrocarbon fuel such as coal with oxygen-enriched air or with relatively pure oxygen to produce carbon monoxide, carbon dioxide and hydrogen presents unique problems not encountered normally in the burner art. It is necessary, for example, to effect very rapid and complete mixing of the reactants, as well as to take special precautions to protect the burner or mixer from over heating. Typically, the fuel injection nozzle serving the combustion chamber is configured to have the slurry fuel stream concentrically surround a first oxidizer gas stream along the axial core of the nozzle. A second oxidizer gas stream surrounds the fuel stream annulus as a larger, substantially concentric annulus. Radially surrounding an outer wall of the outer oxidizer gas channel is an annular cooling water jacket terminated with a substantially flat end-face heat sink aligned in a plane substantially perpendicular to the nozzle discharge axis. Cool water is conducted from outside the combustion chamber into direct contact with the backside of the heat sink end-face for conductive heat extraction.

Because of the reactivity of oxygen and sulfur contaminants with the burner metal, it is imperative to prevent the burner elements from reaching those temperatures at which rapid oxidation and corrosion takes place. In this respect, it is essential that the reaction between the hydrocarbon and oxygen take place entirely outside the burner proper and prevent localized concentration of combustible mixtures at or near the surfaces of the burner elements. Even though the reaction takes place beyond the point of discharge from the burner, the burner elements are subjected to heating by radiation from the combustion zone and by turbulent recirculation of the burning gases.

Moreover, it is believed that a confluence of a recirculated gas flow stream with the nozzle emission stream generates a standing eddy of hot, turbulent combustion product comprising highly corrosive sulfur compounds. These hot, corrosive compounds surround the nozzle discharge orifice in a turbulent manner and scrubs the heat shield face at the confluence.

For these and other reasons, prior art burners are characterized by failures due to metal corrosion about the burner tips, even when these elements have been water cooled and where the reactants have been premixed and ejected from the burner at rates of flow in excess of the rate of flame propagation.

Efforts to ameliorate these harmful effects on the injector nozzle have been disclosed. For example, U.S. Pat. No. 5,934,206 discloses a heat shield having a plurality of ceramic tiles, each covering the end face of a respective arc segment of the annulus around the nozzle. The tiles are formed of a refractory ceramic or other high melting point material as individual elements. The individual tiles are secured to the coolant jacket end face by a high temperature brazing compound.

U.S. Pat. No. 5,954,491 discloses a ceramic heat shield that is mechanically secured over the water jacket end-face of the injector nozzle. This heat shield is formed as an integral ring or annulus around the nozzle orifice. The outer face of the heat shield is substantially smooth and uninterrupted to provide minimum contact with the reaction gases and reduced opportunity for reactive combination. The inner face of the heat shield, i.e., that side contiguous with the water jacket end-face, includes a plurality of socket pairs, each pair in radial alignment around the heat shield annulus. A bayonet channel extends from the outer perimeter of the heat shield, between and parallel with the outer and inner heat shield faces, and through each socket pair. A corresponding number of mounting studs project from the water-jacket end-face. The studs are appropriately positioned to be in register with the sockets. Each stud includes an aperture that aligns axially with respective bayonet channel bores. With the heat shield in position against the water jacket end-face and the end-face studs penetrating the heat shield sockets, bayonet wires are inserted along the radial channel bore to deadbolt the heat shield to the water jacket-end face at multiple attachment points.

U.S. Pat. No. 5,947,716 discloses a heat shield having a pair of rings where each ring is a full annulus about the nozzle axis that faces or shields only a radial portion of the entire water jacket face annulus. An inner ring is mechanically secured to the metallic nozzle structure by meshing segments about the nozzle axis. The external elements of these segments (lugs) are integral projections from the external cone surface of the nozzle lip. Each of three lugs projecting from the external cone lip is an arcuate portion of an independent ring fin. The internal perimeter of the inner heat shield ring is formed with a channel having a corresponding number of cuts in the wall to receive and pass the respective external lug elements. When assembled, the inner heat shielding ring is secured against rotation by a spot welded rod of metal that is applied to the nozzle cooling jacket face within a notch in the outer perimeter of the inner ring. Additionally, the outer perimeter of the inner heat shield ring is formed with an approximately half thickness step ledge or lap that overlaps a corresponding step ledge or lap on the internal perimeter of an outer heat shield ring. The outer heat shield ring is secured to the water jacket face by a second set of external lug elements projecting from the outer perimeter of the water jacket face. A cuff bracket around the perimeter of the outer heat shield ring provides a structural channel for receiving the outer set of water jacket lugs. The outer heat shield ring is also held in place by a tack-welded rod or bar.

U.S. Pat. No. 5,273,212 discloses a shielded burner clad with individual cermaic platelets which are arranged adjacent to each other in a mosaic surface-covering manner.

U.S. Pat. No. 5,941,459 discloses an annular refractory insert is interlocked with the fuel injector nozzle at the downstream end proximate the nozzle outlet. A recess formed in the downstream end of the fuel injector nozzle accomodates the annular refractory insert.

Accordingly, there is still a need for heat shielded burner for synthesis gas generation which is an improvement over the shortcomings of prior art appliances, is simple in construction and economical in operation.

SUMMARY OF THE INVENTION

Briefly, the present invention is an improvement over the previous synthesis gas burner nozzle shielding devices. The burner nozzle assembly has a burner outlet for permitting the flow of fluid carbonaceous fuel and oxygen containing streams into the synthesis gas generation chamber and includes a cooling chamber that concentrically surrounds the burner outlet. The cooling chamber includes an annular heat sink having a flat end-face disposed toward the synthesis gas generation chamber. The annular end-face is generally aligned in a plane substantially perpendicular to the nozzle discharge axis. Cool water is circulated from outside the combustion chamber into direct contact with the backside of the heat sink end-face for conductive heat extraction. The nozzle assembly includes a heat shield having an inner surface that has one surface adjacent to, and preferably in contact with, the annular surface of the heat sink. The heat shield has an outer surface that is positioned toward said synthesis gas generation chamber. To affix the heat shield to the burner nozzle assembly in a manner that facilitates intimate contact between the annular surface of the heat sink and the inner surface of the heat shield, a threaded retaining means is employed.

It is an object of the present invention to provide a heat-shielded burner for synthesis gas generation which is an improvement over the shortcomings of prior art appliances, is simple in construction and economical in operation.

Another object of the invention is to provide a synthesis gas generation burner nozzle having a greater operational life expectancy.

Another object of the present invention is to provide a gas generation burner nozzle for synthesis gas generation having a reduced rate of corrosion.

A further object of the present invention is the provision of a burner nozzle heat shield to protect metallic elements of the nozzle from corrosive combustion gases.

These and other objects and advantages of the present invention will become more apparent to those skilled in the art in view of the following description and the accompanying drawings wherein like parts have similar reference numerals. It is to be understood that the inventive concept is not to be considered limited to the constructions disclosed herein but instead by the scope of the appended claims.

DETAILED DESCRIPTION OF THE INVENTION

Figure 1:
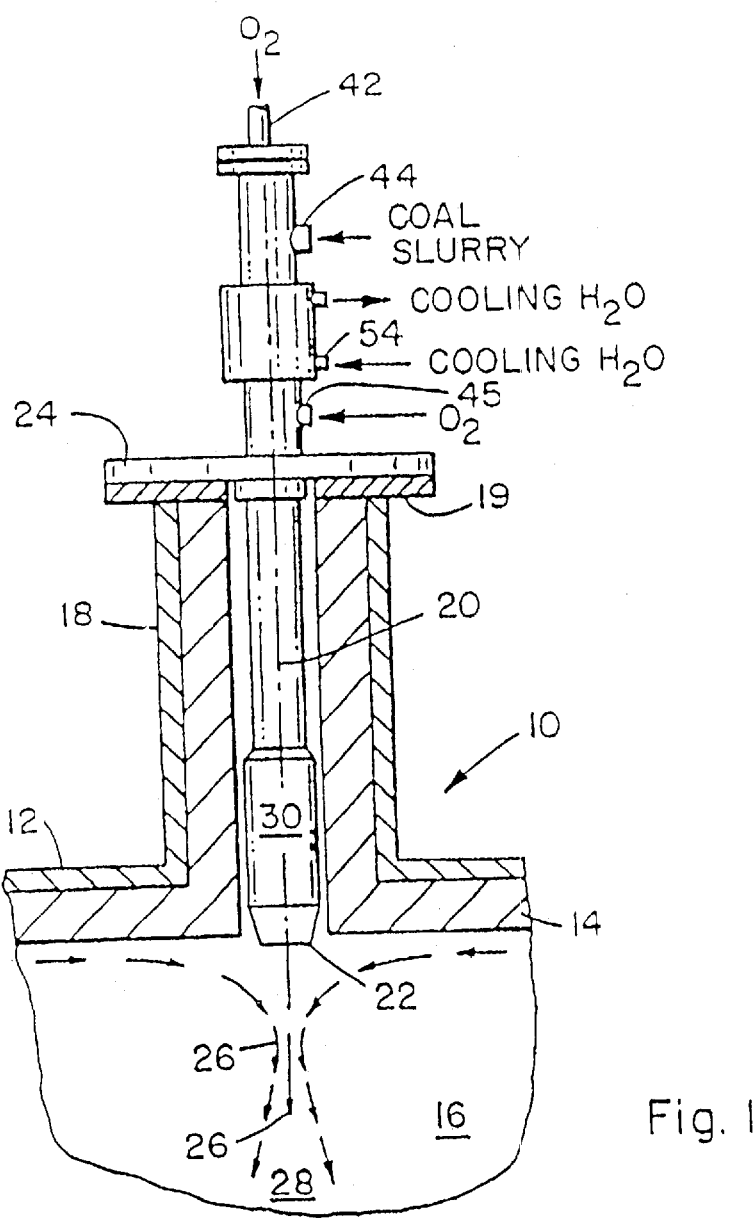
FIG. 1 is a partial sectional view of a synthesis gas generation combustion chamber and burner.

Referring to FIG. 1, a partial cut-away view of a synthesis gas generation vessel 10 is illustrated. The vessel 10 includes a structural shell 12 and an internal refractory liner 14 around an enclosed combustion chamber 16. Projecting outwardly from the shell wall is a burner mounting neck 18 for supporting an elongated fuel injection burner assembly 20 within the reactor vessel. The burner assembly 20 is aligned and positioned so that the face 22 of the burner is substantially flush with the inner surface of the refractory liner 14. A burner mounting flange 24 secures the burner assembly 20 to a mounting neck flange 19 of the vessel 10 to prevent the burner assembly 20 from becoming ejected during operation.

Figure 2:
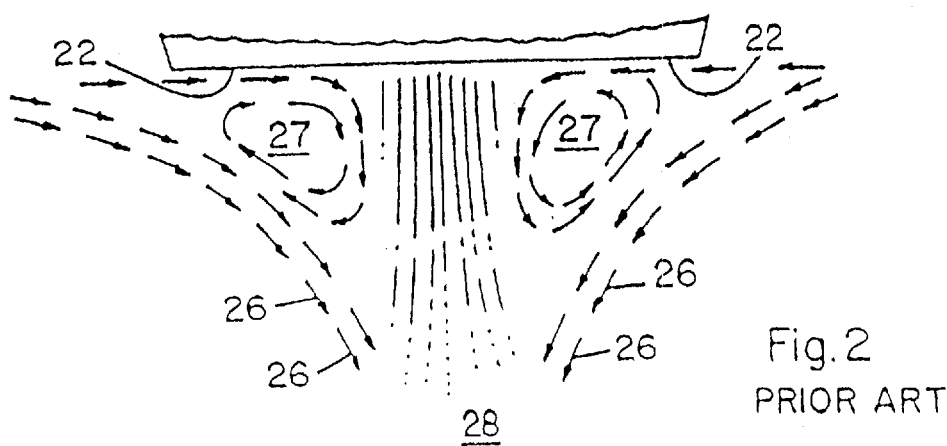
FIG. 2 is a detail of the combustion chamber gas dynamics at the burner nozzle face.

Although not wishing to be bound by any theory, it is believed that FIGS. 1 and 2 partially represent the internal gas circulation pattern within the combustion chamber. Gas flow direction arrows 26 are driven by the high temperature and combustion conditions within the combustion chamber 16. Depending on the fuel and induced reaction rate, temperatures along a reaction core 28 may reach as high as 2500° C. As the reaction gas cools toward the end of the synthesis gas generation chamber 16, most of the gas is drawn into a quench chamber similar to that of the synthesis gas process described by U.S. Pat. No. 2,809,104. However, a minor percentage of the gas spreads radially from the core 28 to cool against the reaction chamber enclosure walls. The recirculation gas layer is pushed upward to the top center of the reaction chamber where it is drawn into the turbulent down flow of the combustion column. With respect to the prior art model of FIG. 2, at the confluence of the recirculation gas with the high velocity core 28, a toroidal eddy flow 29 is produced that turbulently scrubs the burner head face 22 thereby enhancing opportunities for chemical reactivity between the burner head face material and the highly reactive, corrosive compounds carried in the combustion product recirculation stream.

Figure 3:
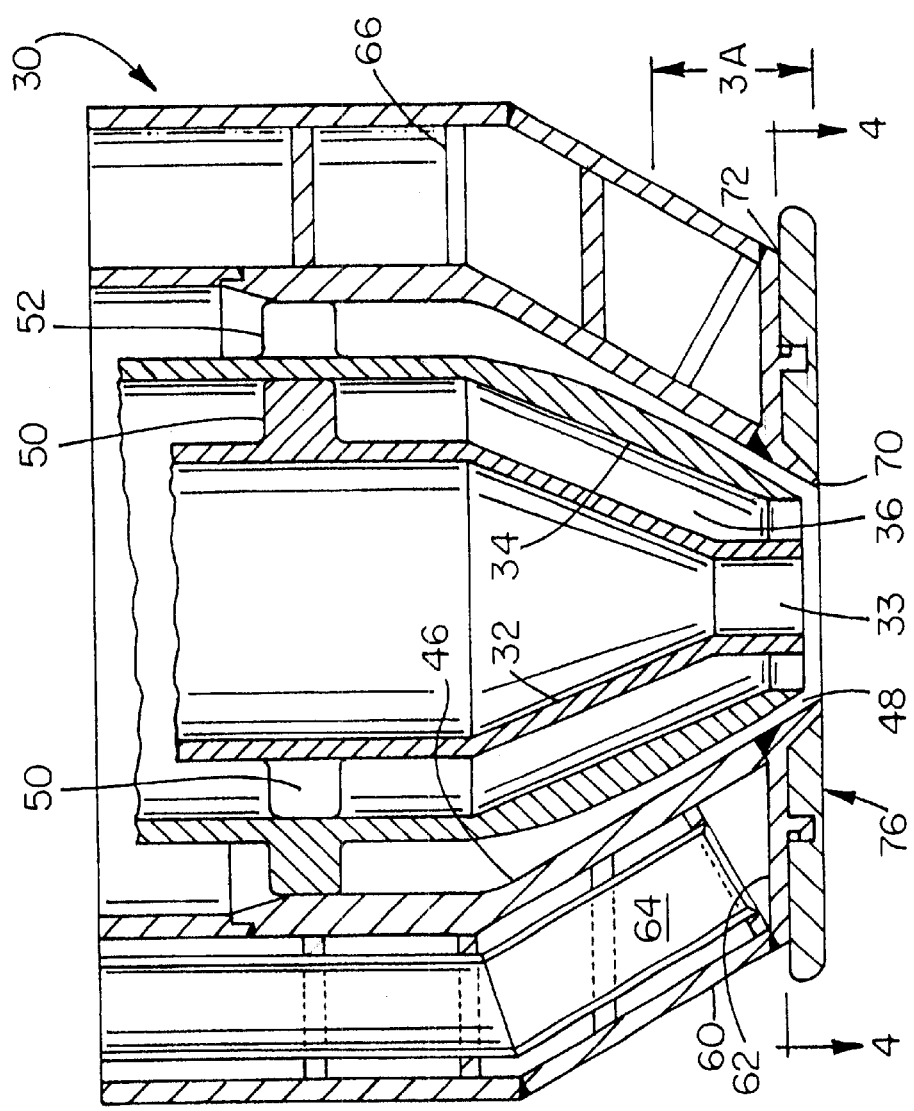
FIG. 3 is a cross-sectional view of the burner nozzle of FIG. 1 fitted with an embodiment of heat shield of present invention.
Figure 3A:
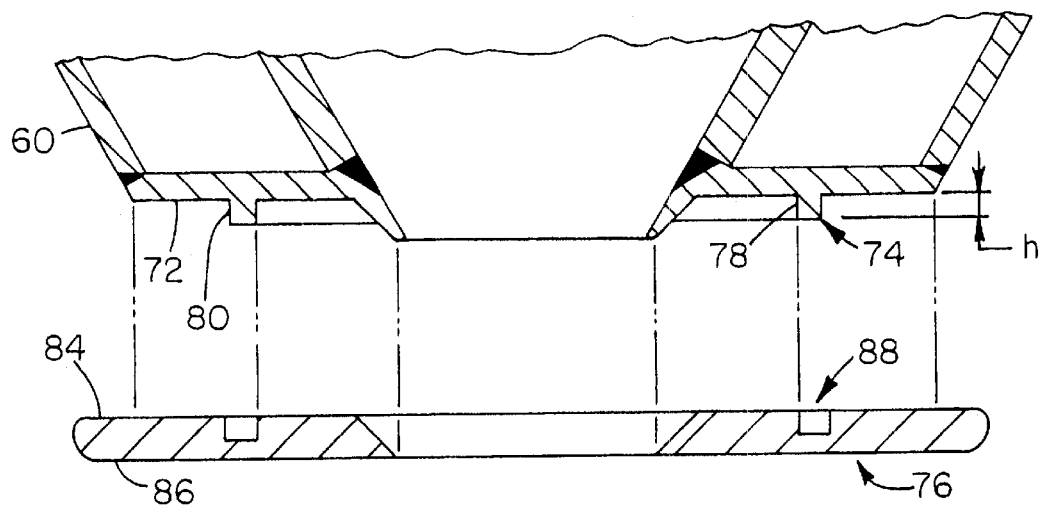
FIG. 3A is an enlarged, exploded view of the cross-sectional view of FIG. 3 taken along axis 3A.

Referring to FIGS. 1 and 3, the burner assembly 20 includes an injector nozzle assembly 30 comprising three concentric nozzle shells and an outer cooling water jacket. The inner nozzle shell 32 discharges from an axial bore opening 33 the oxidizer gas that is delivered along upper assembly axis conduit 42. Intermediate nozzle shell 34 guides the coal slurry delivered to the upper assembly port 44 into the combustion chamber 16. As a fluidized solid, this coal slurry is extruded from the annular space 36 defined by the inner shell wall 32 and the intermediate shell wall 34. The outer, oxidizer gas nozzle shell 46 surrounds the outer nozzle discharge annulus 48. The upper assembly port 45, supplies the outer nozzle discharge annulus with an additional stream of oxidizing gas.

Centralizing fins 50 and 52 extend laterally from the outer surface of the inner and intermediate nozzle shell walls 32 and 34, respectively to keep their respective shells coaxially centered relative to the longitudinal axis of the burner assembly 20. It will be understood that the structure of the fins 50 and 52 form discontinuous bands about the inner and intermediate shells and offer small resistance to fluid flow within the respective annular spaces.

As described in greater detail in U.S. Pat. No. 4,502,633, the entire disclosure of which is incorporated herein by reference, the internal nozzle shell 32 and intermediate nozzle shell 34 are both axially adjustable relative to the outer nozzle shell 46 for the purpose flow capacity variation. As intermediate nozzle 34 is axially displaced from the conically tapered internal surface of outer nozzle 46, the outer discharge annulus 48 is enlarged to permit a greater oxygen gas flow. Similarly, as the outer tapered surface of the internal nozzle 32 is axially drawn toward the internally conical surface of the intermediate nozzle 34, the coal slurry discharge area 36 is reduced.

Surrounding the outer nozzle shell 46 is a coolant fluid jacket 60 having an annular end closure 62. A coolant fluid conduit 64 delivers coolant, such as water, from the upper assembly supply port 54 directly to the inside surface of the end closure plate 62. Flow channeling baffles 66 control the path of coolant flow around the outer nozzle shell to assure a substantially uniform heat extraction and to prevent the coolant from channeling and producing localized hot spots. The end closure 62 includes a nozzle lip 70 that defines an exit orifice or discharge opening for the feeding of reaction materials into the injection burner assembly 20.

Figure 4:
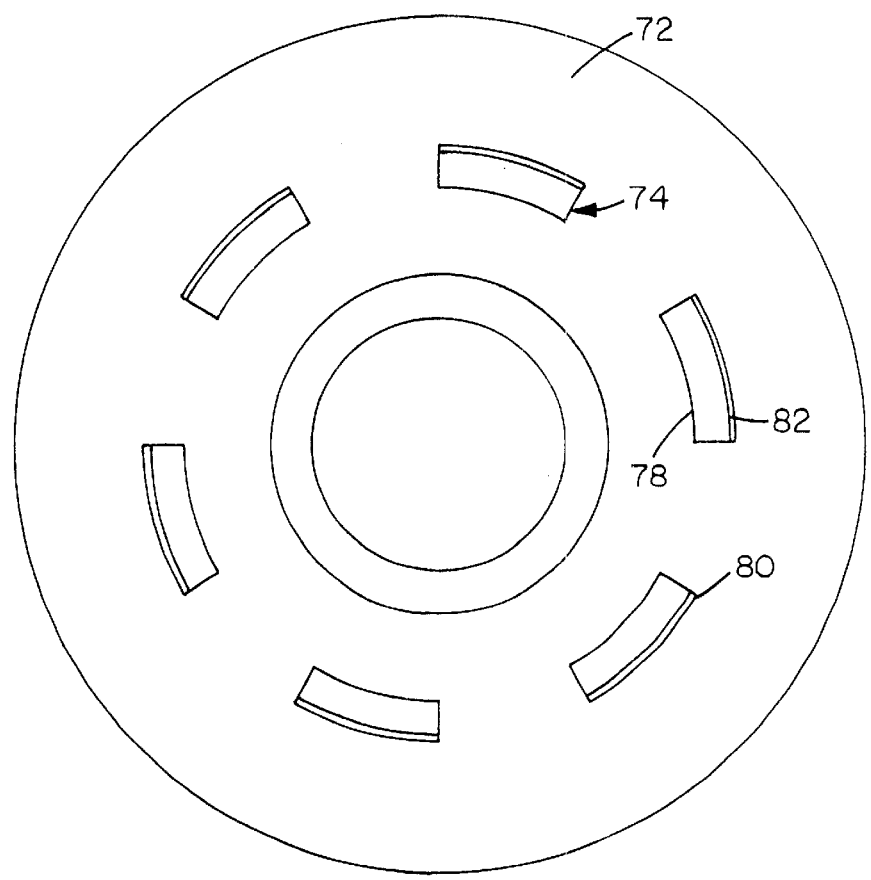
FIG. 4 is a plan view of another embodiment of the present invention wherein the annular cooling surface, taken along line 4—4 of FIG. 3, illustrates a plurality of threaded projections extending from the surface for engaging with a corresponding threaded channel in the heat shield.

Referring to FIGS. 3 through 4, the planar end of the cooling jacket 62 includes an annular surface 72 which is disposed facing the combustion chamber 16. Projecting from the annular surface 72 is a threaded retaining means 74 for affixing a heat shield 76 to the burner nozzle injector assembly 30. The threaded retaining means 74 includes a threaded projection that can be integral to the annular surface 72, that is, machined from a solid metal piece composing the annular surface 72. Alternatively, the retaining means 74 can be a separate member secured to the annular surface 72, in which case the projection 74 can be affixed to the annular surface 72 using methods known to those skilled in the art, such as being welded, screwed on, brazed, and the like. The threaded projection 74 extending from the annular surface 72 can be a continuous member, such as a ring, or a plurality of spaced-apart, individual members preferably, which include at least one arcuate surface and can be cylindrical or crescent shaped.

Typically, the annular surface 72 of cooling jacket is composed of cobalt base metal alloy materials. A problem with this material is that when using high sulfur coal, which is reacted within the closed combustion chamber to produce sulfur containing compounds. Within the reaction chamber 16, these sulfur compounds tend to react with the cobalt base metal alloy materials causing corrosion. A self-consumptive corrosion is sustained that ultimately terminates with failure of the burner assembly 20. Although cobalt is the preferred material of construction for the annular surface 72, other high temperature melting point alloys, such as molybdenum or tantalum may also be used.

Figure 3B:
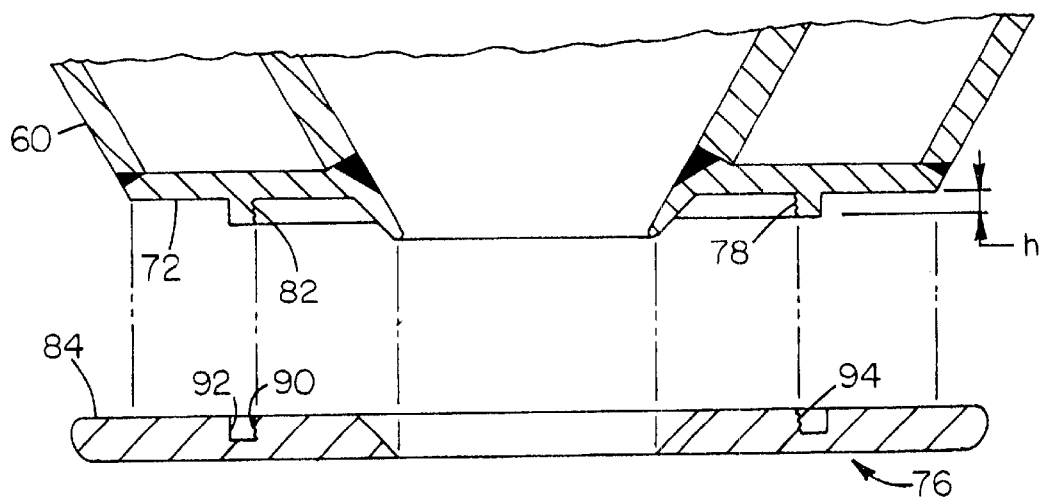
FIG. 3B is an enlarged, exploded view of an embodiment of the heat shield of FIG. 3A illustrating the threads positioned on the inner surface of the heat shield connecting channel.
Figure 3C:
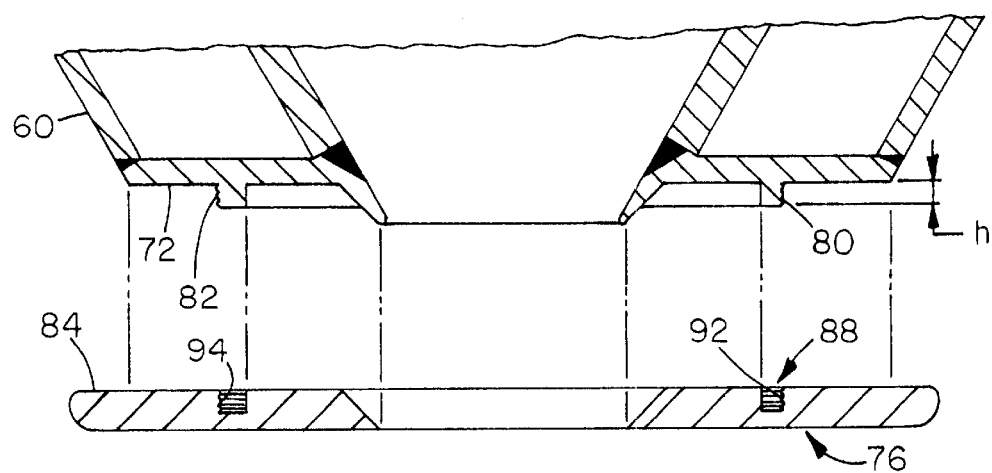
FIG. 3C is an enlarged, exploded view of another embodiment of the heat shield of FIG. 3A illustrating the threads positioned on the outer surface of the heat shield connecting channel.

The threaded projection 74 includes an inner surface 78, and an outer surface 80. As used herein, the terms "inner" and "outer" are descriptive of position relative to the axial opening 33 of the burner assembly wherein an "inner" surface is positioned closer to the opening 33 and an "outer" surface is disposed relatively farther from the opening 33. Referring to FIGS. 3B and 3C, the threaded projection 74 includes a set of threads 82 on at least one of the inner surface 78 and/or outer surface 80.

The heat shield 76 of the present invention includes a first surface 84 and an opposing second surface 86. The first surface 84 is adapted to be positioned adjacent to, and desirably in contact with, the annular surface 72 of cooling jacket 60 and the second surface 86 is disposed toward the combustion chamber 16. The heat shield 76 has an annular channel 88 formed in the first surface 84. The channel 88 is defined by opposing, substantially parallel and inner and outer walls, 90 and 92, respectively. As can be seen in FIGS. 3B and 3C, the channel 88 is positioned to be in alignment with the threaded projections 74 and has a depth that substantially corresponds to the height, H, of the projection 74. Desirably, the depth of the channel 88 is slightly greater that the height, H, of the projection to ensure that the annular surface 74 of cooling jacket will be in contact with the first surface 84 of the heat shield. This facilitates heat transfer from the heat shield 76 to the cooling water circulating within the cooling fluid jacket 60. At least one of the walls, 90 or 92, of the channel 88 includes threads 94 that are adapted to cooperatively engage the threads 82 on the projections thereby affixing and retaining the heat shield 76 proximate to the annular surface 72.

Desirably, the threaded projection 74 includes an arcuate outer surface. Preferably, the threaded projection 74 is a circular configuration. The projection can be a single piece member, such as a ring, or consist of a plurality of projections, each having an arcuate outer surface. The threads 82 on the projection(s) can be positioned on the inner surface 78, however, the outer surface 80 is preferred. As seen in FIG. 4, when a plurality of threaded projections 74 are employed, it is preferred that they be arranged in a circular pattern so that the threads 82 of the projections engage the threads 94 of annular channel 88.

The heat shield 76 is formed from a high temperature melting point material such as silicon nitride, silicon carbide, zirconia, molybdenum, tungsten or tantalum. Representative proprietary materials include the Zirconia TZP and Zirconia ZDY products of the Coors Corp of Golden CO. Characteristically, these high temperature materials should tolerate temperatures up to about 1400° C., include a high coefficient of thermal conductivity, and remain substantially inert within a high temperature, highly reducing/sulfidizing environment.

Figure 5:
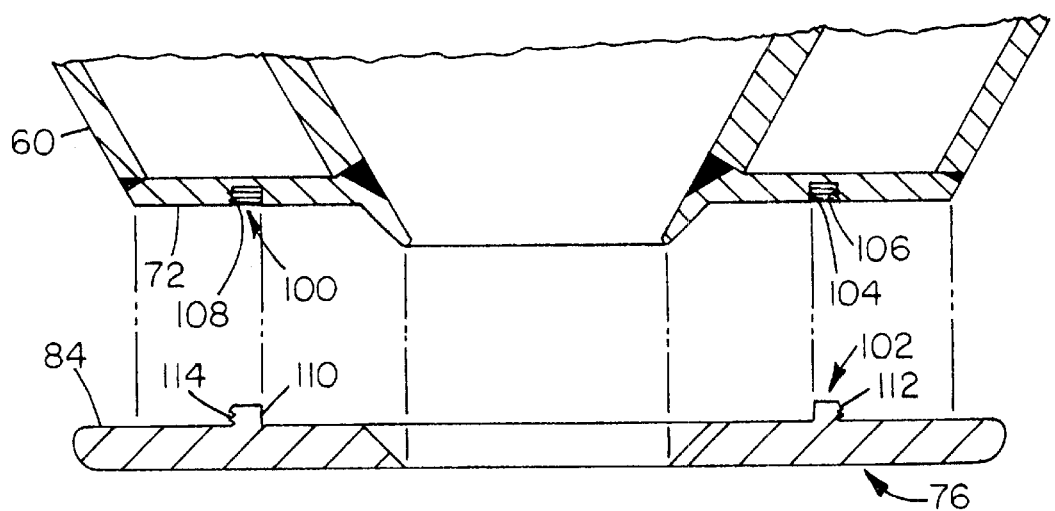
FIG. 5 is a cross-sectional view illustrating another embodiment of the present invention wherein the heat shield includes a threaded projection extending from the surface for engaging with a corresponding threaded annular channel in the annular cooling surface.

Referring to FIG. 5, a cross-sectional view of another embodiment of the present invention is illustrated. This embodiment is similar to that discussed above except that the annular surface 72 includes an annular channel 100 and the heat shield 76 includes a threaded projection 102 for affixing a heat shield 76 to the burner nozzle injector assembly 30. The threaded projection 102 extends from the first surface 84 toward the annular surface 72 for affixing a heat shield 76 to the burner nozzle injector assembly 30. The threaded projection 102 can be a continuous member, such as a ring, or consist of a plurality of spaced-apart, individual members preferably arranged in a pattern which corresponds to and is in alignment with the annular channel 100. Each member will typically have at least one arcuate surface.

The channel 100 is defined by opposing, substantially parallel and inner and outer walls, 104 and 106, respectively. At least one of the walls, 104 or 106, includes threads 108.

The threaded projection 102 includes an inner surface 110 and an outer surface 112. The threaded projection 74 includes a set of threads 114 on at least one of the inner surface 110 and/or outer surface 112.

To affix the heat shield 76 to the annular surface 72, the threads 108 are adapted to correspond and-engage with the threads 114 on the projection 102.

Figure 6:
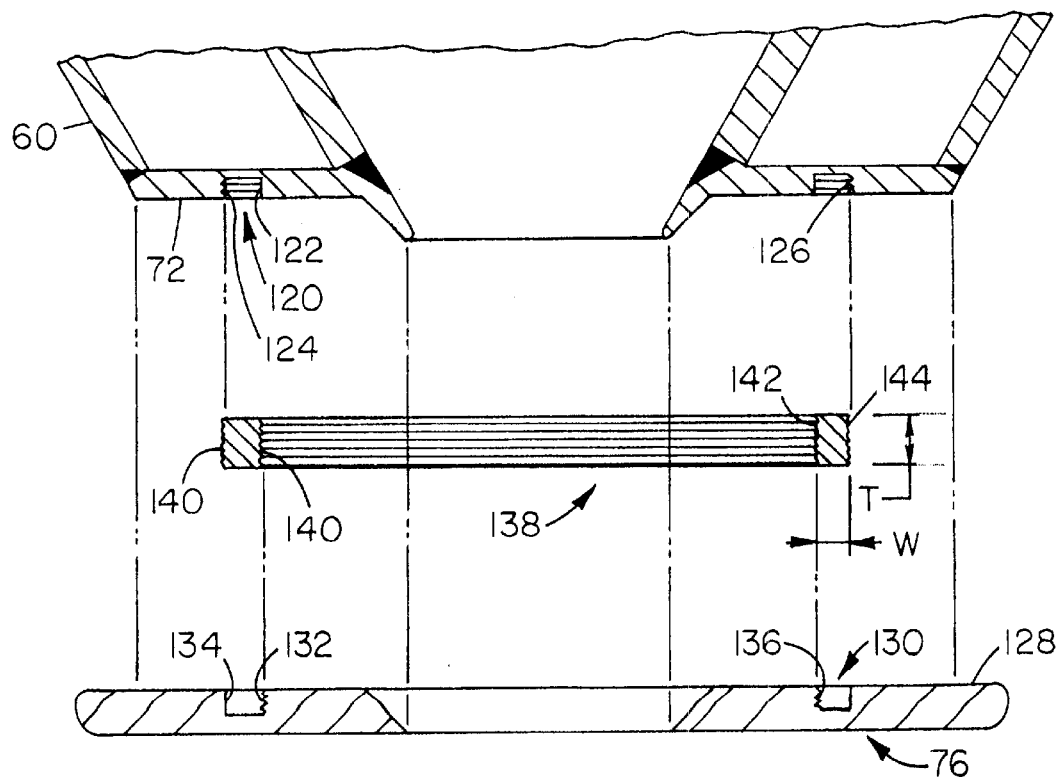
FIG. 6 is a cross-sectional view of another embodiment of the present invention wherein both the heat shield and the annular cooling surface have a channel and a threaded retaining ring is adapted to engage both channels.

Referring to FIG. 6, a cross-sectional view of another embodiment of the present invention is illustrated. In this embodiment, the annular surface 72 of the cooling jacket includes an annular channel 120. The annular channel 120 is defined by a first pair of opposing, substantially parallel and inner and outer walls, 122 and 124, respectively. At least one of the walls, 122 and/or 124, includes threads 126.

The heat shield 76 has a first surface 128 that is adapted to be positioned adjacent to, and desirably in contact with, the annular surface 72. The heat shield 76 has an annular channel 130 formed in the first surface 128. The channel 130 is defined by a second pair of opposing, substantially parallel and inner and outer walls, 132 and 134, respectively. At least one of the walls, 132 and/or 134, includes threads 136. The channels 120 and 130 are positioned in the annular surface 72 and in the heat shield 76, respectively, in such a manner as to be in substantial alignment when a threaded retaining means 138 is mated to the two channels 120 and 130.

The threaded retaining means 138 preferably is a ring having a thickness, T, less than the combined depths of channels 120 and 130 so that when the threads of the two channels 120 and 130 engage the threaded retaining ring 138, the first surface 128 of the heat shield 76 will lie proximate to and preferably will be in contact with the annular surface 72 of the cooling jacket. One will recognize that the width, W, of the retaining ring 138 can be, and preferably is, less than the widths of the channels 120 and 130. The retaining ring 138 configured in this manner will be able to more freely engage the threads 126 and 136 of channels 120 and 130, respectively.

The threaded retaining ring 138 includes mating threads 140 that cooperatively engage the threads 126 and 136 of the channels 120 and 130, respectively. The threads 140 can be located on an inner surface 142, an outer surface 144 or both surfaces 142 and 144 of the retaining ring 140. Preferably, the threads 140 are located on the outer surface 144 of the retaining ring 138 since this allows for ease of manufacture for all the mating surfaces.

The threaded retaining ring 138 is desirably fabricated from a material that is compatible with the annular surface 72 material and the heat shield 76. Preferably, the threaded retaining ring 138 is fabricated from extremely high temperature resistant materials such as an R30188 metal as defined by the Unified Numbering System for Metals and Alloys. This material is a cobalt base metal that is alloyed with chrome and tungsten. Other high temperature melting point alloys such as molybdenum or tantalum may also be used.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents.

We claim:

1. In a burner nozzle assembly for the production of synthesis gas by the partial oxidation of carbonaceous fuel in a synthesis gas generation chamber, wherein said burner nozzle assembly includes a burner outlet for permitting the flow of said carbonaceous fuel and an oxygen containing streams into the synthesis gas generation chamber, wherein said improvement comprises:

a cooling chamber concentrically surrounding and adjacent to said burner outlet and having a annular surface facing said synthesis gas generation chamber;

a heat shield having an inner surface proximate to said annular surface and an outer surface positioned toward said synthesis gas generation chamber; and threaded retaining means for affixing said heat shield adjacent to said annular surface, wherein said retaining means includes a threaded projection extending from at least one of said annular surface or said inner surface and an annular channel on the other surface, said annular channel having opposing substantially parallel walls, wherein said threaded projection and said annular channel are cooperatively aligned relative to each other and at least one of said walls includes a corresponding engaging thread.

2. The burner nozzle of claim 1 wherein said threaded projection is a ring having an inner surface and an outer surface and said threads are on said outer surface of said ring.

3. The burner nozzle of claim 1 wherein said threaded projection is a ring having an inner surface and an outer surface and said threads are on said inner surface of said ring.

4. The burner nozzle of claim 1 wherein said threaded projection includes a plurality of threaded projections extending from at least one of said annular surface or said inner surface; and wherein said plurality of threaded projections and said annular channel are cooperatively aligned relative to each other.

5. The burner nozzle of claim 4 wherein said plurality of threaded projections are evenly positioned in a circular configuration.

6. The burner nozzle of claim 1 wherein said threaded projection is positioned on said annular surface and said annular channel is in said inner surface.

7. The burner nozzle of claim 1 wherein said threaded projection is positioned on said inner surface and said annular channel is in said annular surface.

8. The burner nozzle of claim 1 wherein said heat shield includes a material having a high coefficient of thermal conductivity selected from the group consisting of silicon nitride, silicon carbide, zirconia based ceramics, molybdenum, tungsten and tantalum.

9. In a burner nozzle assembly for the production of synthesis gas by the partial oxidation of carbonaceous fuel in a synthesis gas generation chamber, wherein said burner nozzle assembly includes a burner outlet for permitting the flow of said carbonaceous fuel and an oxygen containing streams into the synthesis gas generation chamber, wherein said improvement comprises:

a cooling chamber concentrically surrounding and adjacent to said burner outlet and having a annular surface facing said synthesis gas generation chamber wherein said annular surface includes a threaded annular projection; and a heat shield having an inner surface proximate to said annular surface and an outer surface positioned toward said synthesis gas generation chamber wherein said heat shield has an annular channel with opposing substantially parallel walls and at least one of said walls includes a corresponding engaging thread, said threaded annular projection and said annular channel are cooperatively aligned relative to each other whereby said heat shield can be affixed to said annular surface.

10. The burner nozzle of claim 9 wherein said threaded annular projection is a ring having an inner surface and an outer surface and said threads are on said outer surface of said ring.

11. The burner nozzle of claim 9 wherein said threaded annular projection is a ring having an inner surface and an outer surface and said threads are on said inner surface of said ring.

12. The burner nozzle of claim 9 wherein said threaded annular projection comprises a plurality of threaded arcuate projections evenly positioned about a circular configuration.

13. In a burner nozzle assembly for the production of synthesis gas by the partial oxidation of carbonaceous fuel in a synthesis gas generation chamber, wherein said burner nozzle assembly includes a burner outlet for permitting the flow of said carbonaceous fuel and an oxygen containing streams into the synthesis gas generation chamber, wherein said improvement comprises:

a cooling chamber concentrically surrounding and adjacent to said burner outlet and having a annular surface facing said synthesis gas generation chamber wherein said annular surface includes a thread ring projecting from said annular surface; and a heat shield having an inner surface proximate to said annular surface and an outer surface positioned toward said synthesis gas generation chamber wherein said heat shield has an annular channel with opposing substantially parallel walls and at least one of said walls includes a corresponding engaging thread, said threaded ring and said annular channel are cooperatively aligned relative to each other whereby said heat shield can be affixed to said annular surface.

14. The burner nozzle of claim 13 wherein said ring has an inner surface and an outer surface and said threads are on said outer surface of said ring.

15. The burner nozzle of claim 13 wherein said ring has an inner surface and an outer surface and said threads are on said inner surface of said ring.

16. The burner nozzle of claim 13 wherein said ring comprises a plurality of arcuate projections evenly positioned in a circular configuration.

* * * * *